May 28, 1940.　　　H. W. HOWLEY　　　2,202,658
STABILIZER FOR TRAILERS
Filed Oct. 13, 1937　　　3 Sheets-Sheet 1
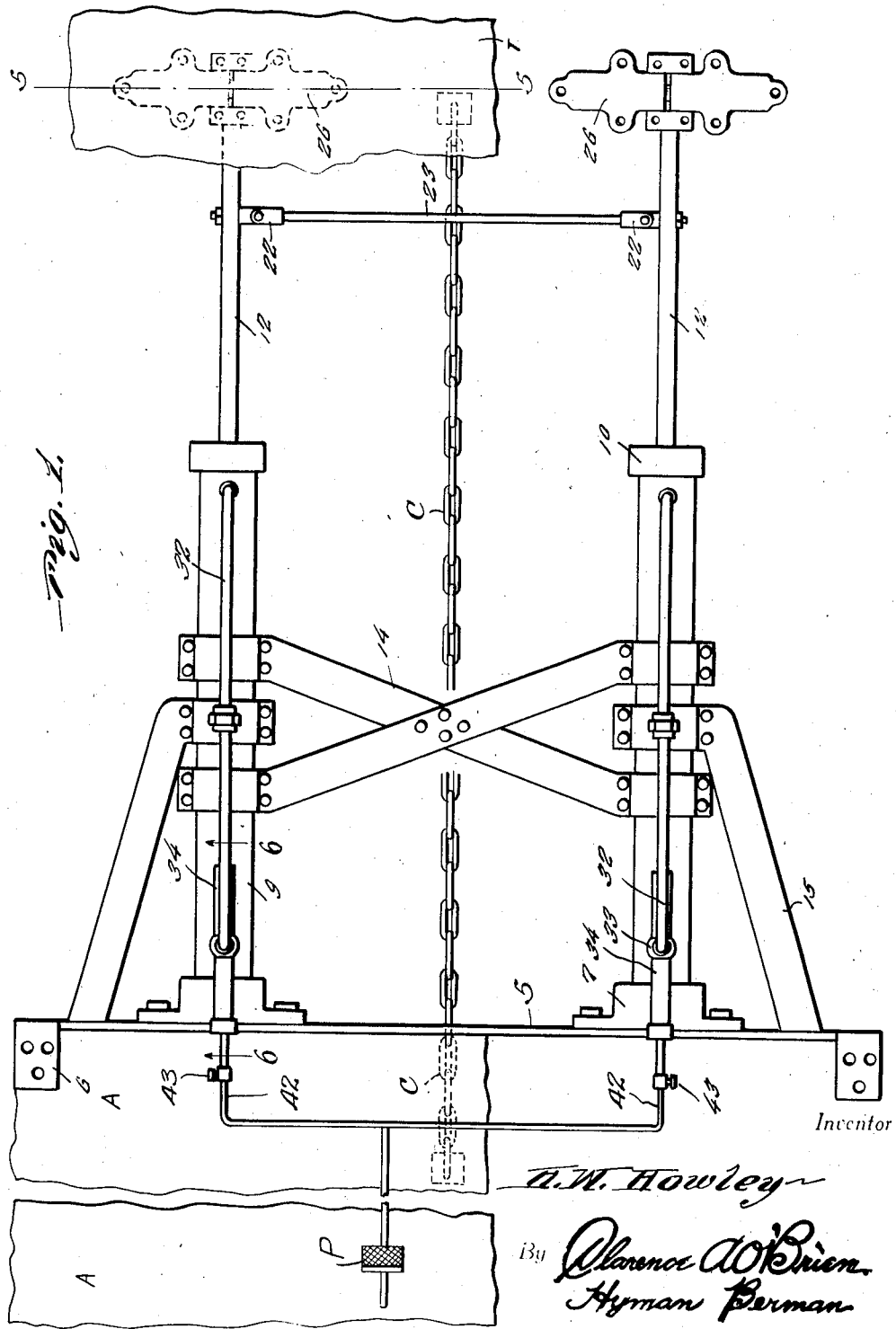

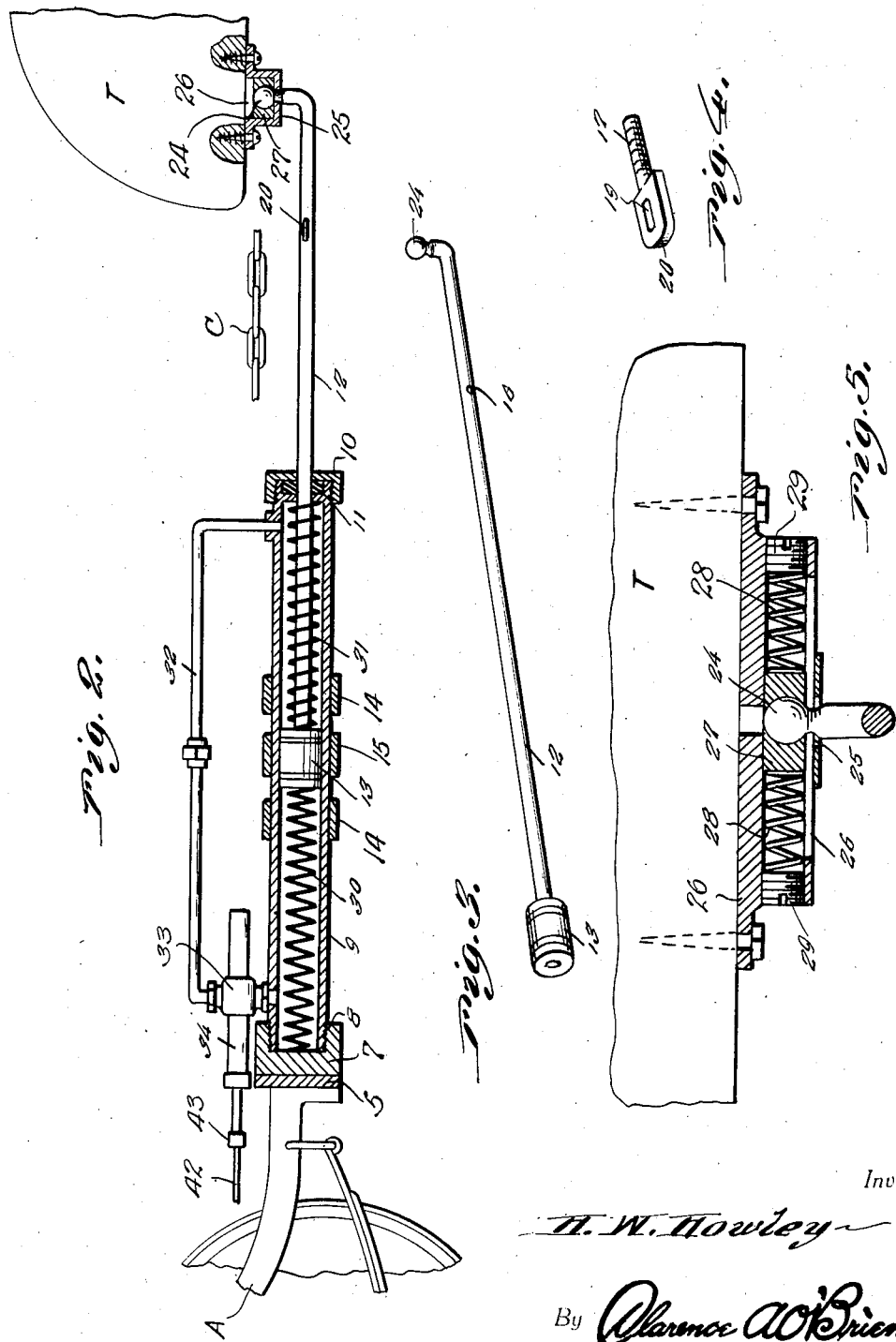

May 28, 1940.  H. W. HOWLEY  2,202,658
STABILIZER FOR TRAILERS
Filed Oct. 13, 1937  3 Sheets-Sheet 3
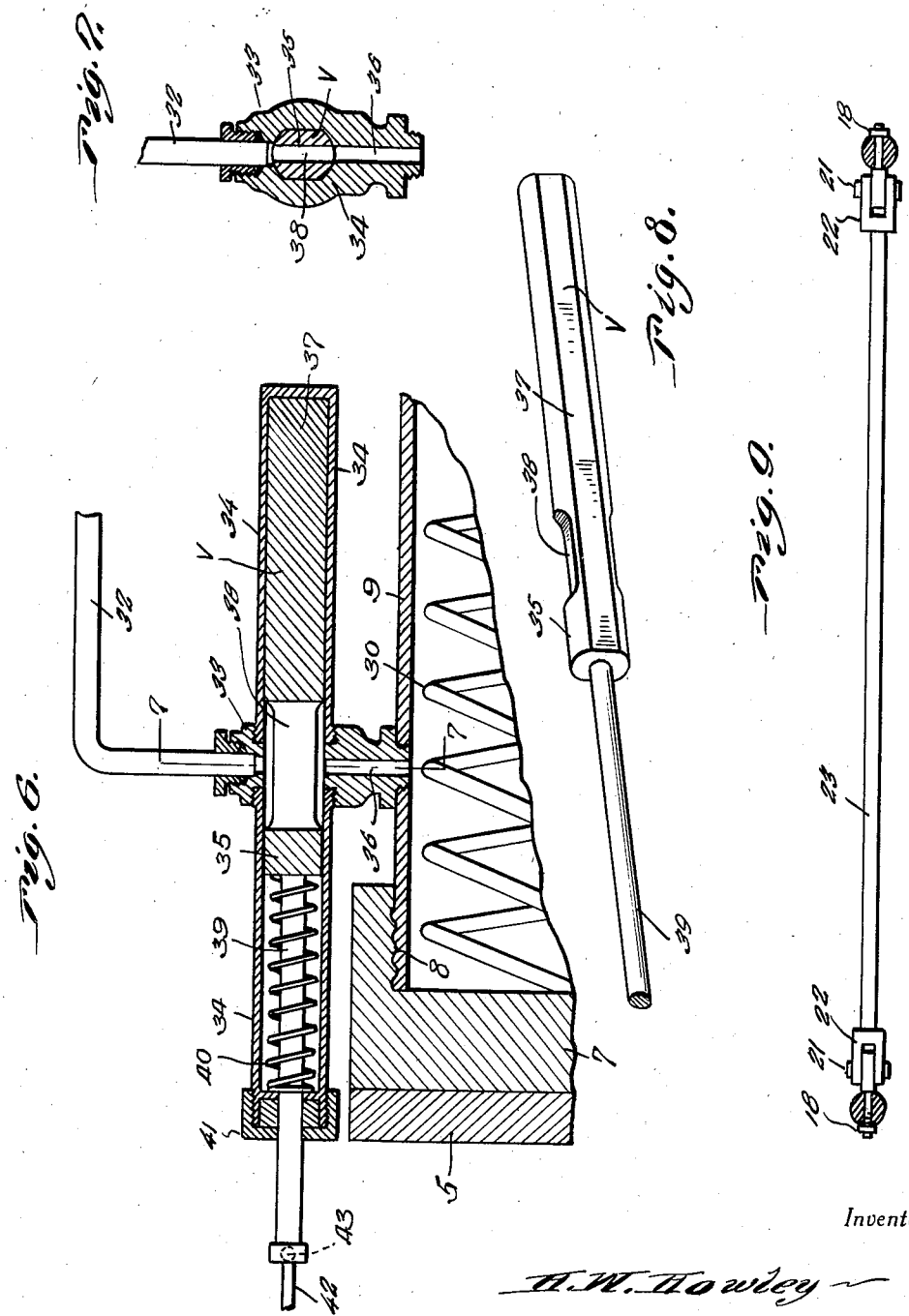

Patented May 28, 1940

2,202,658

UNITED STATES PATENT OFFICE 2,202,658

STABILIZER FOR TRAILERS

Hubert William Howley, Lawrence, Mass.

Application October 13, 1937, Serial No. 168,819

4 Claims. (Cl. 280—33.9)

The present invention relates to stabilizing devices for trailers to prevent swerving of the trailer when the brakes are applied to the pulling vehicle and has for its primary object to provide a pair of liquid pressure cylinders attached at opposite sides of the trailer and having a piston working therein together with control means for the liquid at opposite ends of the piston to release or stop the piston within the cylinder.

A further object is to provide a stabilizing apparatus of this character in which the control means for the respective cylinders extends to the pulling vehicle to be operated by hand, by the steering mechanism, or by the brakes of the pulling vehicle to control the resistance to which the pistons are subjected in the cylinders when the pulling vehicle is making right or left hand turn in order to overcome any tendency of the trailer to swerve during said turning action.

A still further object is to provide an apparatus of this character of simple and practical construction, which is efficient and reliable in operation, relatively inexpensive to manufacture and installed and otherwise well adapted for the purposes for which the same is intended.

Other objects and advantages reside in the details of construction and operation as more fully hereinafter disclosed and claimed, reference being had to the accompanying drawings forming part hereof, wherein like numerals refer to like parts and in which:

Figure 1 is a top plan view of the stabilizer in assembled position attached to the trailer and pulling vehicle.

Figure 2 is a longitudinal sectional view through one of the cylinders.

Figure 3 is a perspective view of one of the pistons and piston rods for attaching to the trailer.

Figure 4 is a detail of the connecting pin for the cross bar extending between the pair of piston rods.

Figure 5 is a sectional view through the ball and socket connection for the piston rod.

Figure 6 is an enlarged longitudinal sectional view through the valve provided for controlling communication between the opposite ends of the cylinder.

Figure 7 is a sectional view taken substantially on a line 7—7 of Fig. 6.

Figure 8 is a fragmentary perspective view of the valve.

Figure 9 is a front elevational view of the cross bar connecting the pair of piston rods, with the latter shown in section.

In the drawings, A represents a pulling vehicle and T is a trailer connected thereto by a chain, or draw bar, indicated by C. This chain or draw bar limits the distance between the pulling vehicle A and the trailer T, but may allow a certain amount of flexibility and particularly permits the trailer T to follow the pulling vehicle A on turns.

P represents a pedal which ordinarily would be the regular brake pedal but might be a special emergency pedal or a regular emergency brake pedal.

Referring now to the drawings in detail, wherein for the purpose of illustration I have disclosed a preferred embodiment of invention, the numeral 5 designates an attaching plate having attaching ears or hinges 6 at the ends thereof for attaching the plate transversely behind a pulling vehicle A with the plate in a vertical position and to the rear face thereof is secured a pair of blocks 7 adjacent each end of the plate, each of said blocks having an internally threaded recess 8 for threadedly receiving one end of a cylinder 9.

The construction of the cylinders 9 and their associated parts are identical and accordingly a detailed description of one of the cylinders will suffice. A cap 10 is threaded on the opposite end of the cylinder enclosing a packing gland 11, said cap and packing gland having a central opening through which a piston rod 12 is slidably inserted, the inner end of the piston rod having a piston 13 secured thereto, said piston working in the cylinder 9. Cross braces 14 extend between the pair of cylinders and braces 15 are also provided between an intermediate portion of the cylinders and the plate 5 as will be apparent from an inspection of Fig. 1 of the drawings.

The outer end of each of the rods 12 is provided with a laterally extending ball 24 inserted upwardly through an opening 25 in a bracket 26 secured to the underside of the trailer T. Within the bracket 26 at each side of the ball 24 is positioned blocks 27 maintained in position by coil springs 28 secured within the bracket by threaded plugs 29.

Coil springs 30 and 31 are positioned in the cylinder 9 at each end of the piston 13 and each end of the cylinder is also supplied with a quantity of oil or other liquid, the oil being by-passed from one end of the cylinder to another by a pipe 32 connecting the respective ends of the cylinder. The pipe 32, adjacent the forward end of the cylinder is provided with a fitting 33 supporting an elongated valve casing 34 positioned in spaced parallel relation above the cylinder, said valve casing having a valve V slidably mounted in the casing for controlling communication through the passage 36 of the fitting. Valve V is elongated and includes the ends or heads 35 and 37, both snugly slidable in casing 34 and between them having a slotted opening 38 therein to provide communication between the pipe 32 and passage 36 when the valve is in its normal open position, the opposite end of the valve being provided with a stem 39 about which is arranged a coil spring 40 yieldably maintaining the valve in such open position as will be apparent from an inspection of Figure 6 of the drawings.

The stem 39 projects outwardly through the casing 34 through a threaded cap 41 and has a wire 42 connected at one end to the stem by a set screw 43, the other end of said wire extending to the pulling vehicle where it can be pulled by the hand of the operator, or both wires can be brought together or connected to a cross bar, or one or both can be connected to the tie rod or to some other part of the steering mechanism, or one or both can be connected to some part of the regular or emergency brake mechanism such as P.

Each valve is so arranged that each spring 40 will keep its valve normally open so that liquid can pass from pipe 32 and passage 36 in either direction from one end of the cylinder to the other, through the slotted part 38. This part 38 is relatively long so that any accidental pull on a wire 42, such as caused by bumps or normal swerving, will not close the valve. A predetermined distinct pull is necessary to close the valve or valves, thus stopping the piston dead.

The ends or heads 35 and 37 of valve V fit smoothly in casing 34, the head 35 keeping oil away from the spring 40 and from plugging it up and head 37 serving to close the passage from pipe 32 to passage 36 when the valve is pulled by wire 42. When so pulled, some vacuum will be created beyond head 37 but not sufficient to stop the pull and this vacuum, with compression spring 40, helps to pull the valve back and to keep it back in its normal open position.

The slot 38 is long enough and the fitting 33 is so located that under ordinary running conditions, the liquid moves freely from one end of each cylinder 9 to the other, but when either wire 42 is pulled sufficiently, a head 37 closes the valve, the parts being so arranged that this head cannot be pulled beyond the passage as the compressing of spring 40 will prevent it.

The valve on either cylinder can be closed, thus stopping dead the piston on one side, while the other may continue to have some movement, but preferably, both valves work together so that both cylinders are stopped dead where they happen to be, thus making a rigid connection. Such a rigid connection so combines the center of gravity or the composition of forces operating on the pulling vehicle and the trailer that jack-knifing is impossible unless something breaks.

It is believed the details of construction and operation of the apparatus will be readily understood from the foregoing without further detailed explanation.

What is claimed is:

1. A stabilizing attachment for trailers comprising a pair of cylinders attached to a pulling vehicle at opposite sides thereof, a piston having a working fit in each of said cylinders, piston rods extending from said pistons rearwardly of the cylinders, a ball and socket connection between the rear ends of the piston rods and the trailer, liquid pressure means within the cylinder at opposite ends of the piston, a by-pass connecting the opposite ends of each cylinder and valve means interposed in said by-pass for controlling passage of liquid therethrough, said valve means being operable from the pulling vehicle for closing said valve and spring means for opening said valve.

2. A stabilizing attachment for trailers comprising a pair of cylinders, means for attaching the cylinders in spaced parallel relation to a pulling vehicle adjacent the opposite sides thereof, a piston working in each of said cylinders, a piston rod extending from each of said pistons rearwardly of the cylinders, a laterally slidable ball and socket connection between the rear ends of each of said piston rods and the trailer, springs within the cylinders at opposite sides of the piston, liquid pressure means within each of said cylinders, a by-pass pipe connecting the opposite ends of said cylinders and valve means for each of said pipes and comprising a casing extending longitudinally of the cylinder, a valve slidably mounted in said casing for controlling communication through said pipe, said valve having an extension at one end provided with a slotted opening registrable with the pipe when the valve is in open position, spring means yieldably maintaining the valve in open position, a stem extending from the valve through the casing and a flexible connection between the stem and the pulling vehicle for closing said valve.

3. A stabilizing attachment for trailers comprising a pair of cylinders, means for attaching the cylinders in spaced parallel relation adjacent the opposite sides of a pulling vehicle, a piston having a working fit in each of said cylinders, piston rods extending from the pistons rearwardly of the cylinders, a laterally slidable ball and socket connection between the rear ends of each of said rods and the trailer, liquid pressure means within the cylinder and means extending to the pulling vehicle for controlling passage of the liquid to opposite ends of said cylinders.

4. The combination with a pulling vehicle and a trailer attached thereto; of a stabilizing attachment comprising a pair of cylinders fixed to the back of the pulling vehicle at opposite sides thereof, a piston having a head with a working fit in each of said cylinders, a piston rod extending from each piston rearwardly of the cylinders, a pivotal connection between the rear ends of the piston rods and the trailer, compression springs extending between the piston heads and each end of each cylinder, a by-pass which connects the opposite ends of each cylinder, liquid substantially filling each cylinder and by-pass, and a slide valve interposed in the by-pass, together with a spring which normally keeps the valve open, and a flexible connection extending from the valve to the pulling vehicle whereby the valve can be closed against the pressure of the valve spring.

HUBERT WILLIAM HOWLEY.